C. O. ERIKSON.
GUM FILTER.
APPLICATION FILED AUG. 3, 1909.
984,364.
Patented Feb. 14, 1911.
2 SHEETS—SHEET 1.
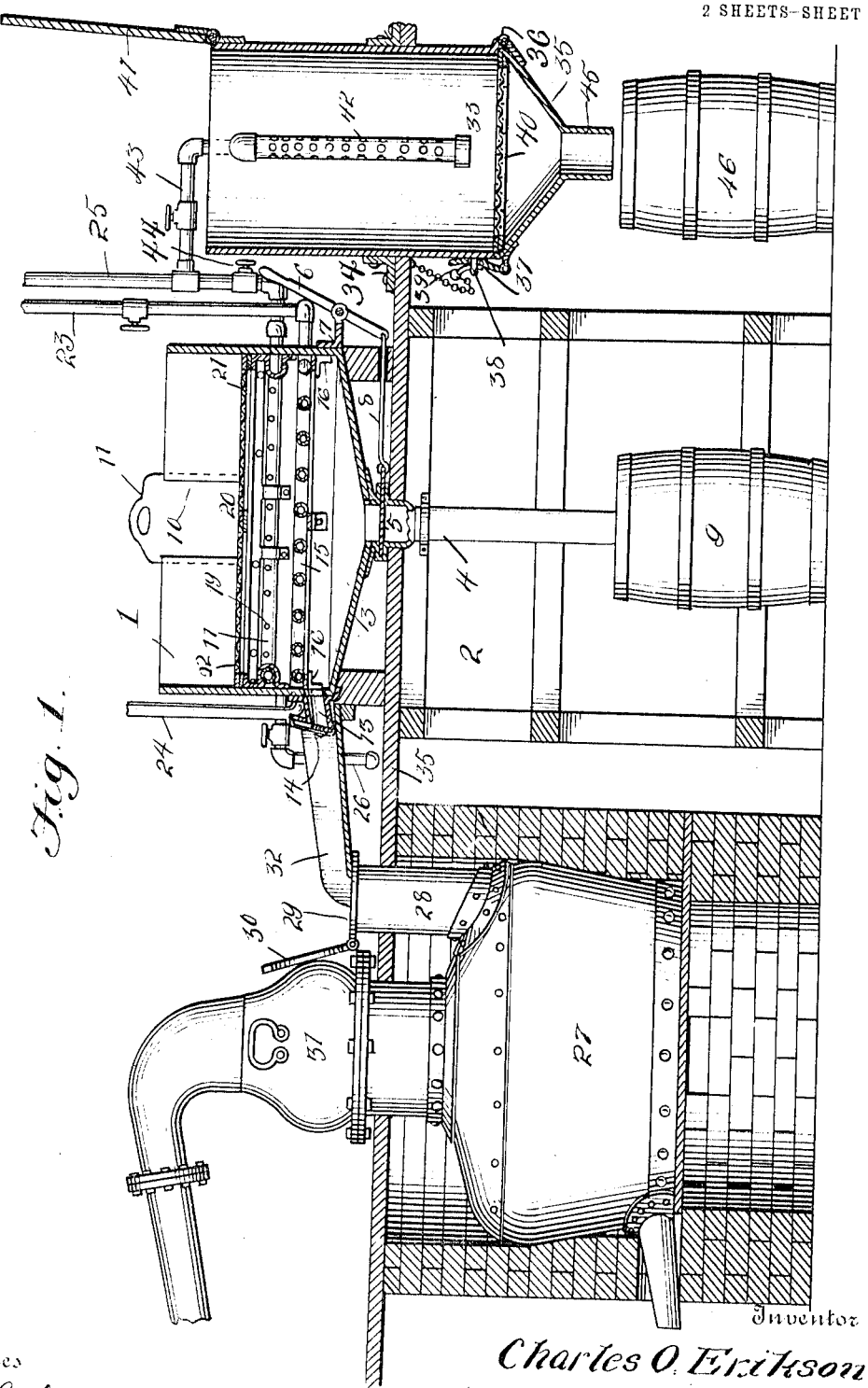
Witnesses
J. L. Wright
J. W. Garner
Inventor
Charles O Erikson
By Victor J. Evans,
Attorney

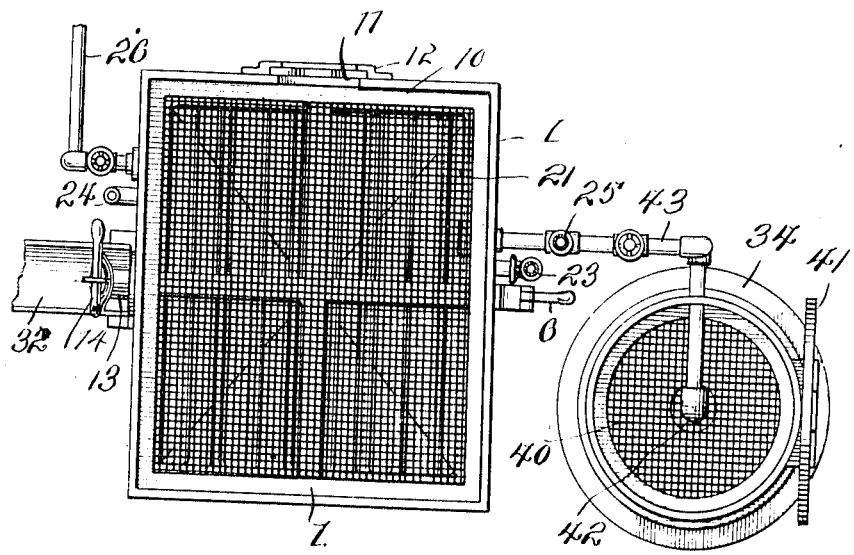
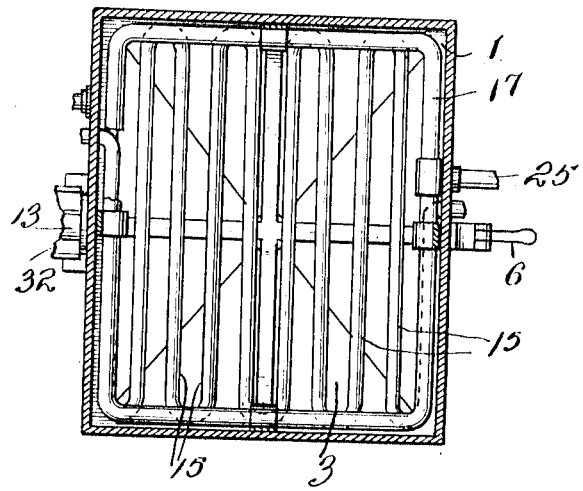
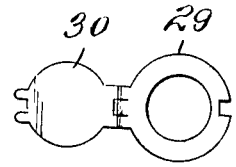

UNITED STATES PATENT OFFICE.

CHARLES O. ERIKSON, OF DOUGLAS, GEORGIA, ASSIGNOR OF ONE-FOURTH TO L. L. HALL, ONE-FOURTH TO F. M. APPLEBY, AND ONE-FOURTH TO C. T. ROAN, ALL OF DOUGLAS, GEORGIA.

GUM-FILTER.

984,364.  Specification of Letters Patent.  Patented Feb. 14, 1911.

Application filed August 3, 1909. Serial No. 510,961.

*To all whom it may concern:*

Be it known that I, CHARLES O. ERIKSON, a citizen of the United States, residing at Douglas, in the county of Coffee and State of Georgia, have invented new and useful Improvements in Gum-Filters, of which the following is a specification.

This invention relates to improvements in gum filters for use in separating crude turpentine gum from chips, bark, sand, earth and other impurities prior to introducing the gum into the still for the production of turpentine and naval stores and the said invention consists in the construction, combination and arrangement of devices hereinafter described and claimed.

In the accompanying drawings:—Figure 1 is a vertical longitudinal sectional view of a gum filter constructed in accordance with my invention, in operative connection with the still and with a reclaiming apparatus. Fig. 2 is a plan of my improved gum filter and also of the reclaiming apparatus. Fig. 3 is a horizontal sectional view on the plane indicated by the line *a—a* of Fig. 1. Fig. 4 is a detail plan of the closure for the inlet tube of the still.

In accordance with my invention I provide a separating tank 1 which is supported on a suitable frame or scaffold 2. The tank is here shown as rectangular in plan and as provided with a downwardly tapering hopper shaped bottom 3 in the center of which, at the lowest point, is a discharge tube 4 in which is a cut-off slide or valve 5 which is operated by a lever 6, the said lever being pivoted on a bracket 7 which extends from one side of the tank and connected to the slide or cut-off by a rod 8. In practice, a cask or other suitable receptacle 9 is at the lower end of the discharge pipe 4. In one side of the tank and extending downwardly from the upper edge thereof for a suitable distance is a gate-way 10. Said gate-way is controlled by a vertically movable gate 11 which operates in a guide 12 on the outer side of the tank. At one side of the separating tank, at a suitable distance from the bottom thereof, is a discharge spout 13 which is controlled by a pivotally mounted gate 14. A steam coil 15 extends across the separating tank and is supported at a suitable distance from the bottom thereof on suitable supporting brackets 16. A blow-up or agitating coil 17 extends around the walls of the tank on the inner side thereof, is supported at a suitable distance above the heating coil 15 by suitable supporting devices 18 and has perforations 19 so disposed as to direct jets of steam upwardly and inwardly from the said coil. A screen 20 is supported on a suitable grid or spider 21 which grid or spider is supported on a suitable flange bar 22 which is secured to the inner side of the separating tank and extends around the walls thereof but slight distance above the blow-up coil. The flow pipe for the heating coil 15 is shown at 23 and the return pipe therefor at 24. The steam feed pipe for the blow-up coil is shown at 25. A valve pipe 26 is connected to the blow-up coil to discharge water of condensation therefrom.

The still kettle 27 is provided in one side with an inlet 28 which has at its upper end a flange plate 29 and a cover 30 hinged to said flange plate and which when closed may be secured by a suitable bolt. Said inlet 28 enables the still kettle to be supplied by the gum from the separating tank without the necessity of first removing the cap 31. A conduit 32 leads from the spout 13 and discharges into the inlet 28 so that when the cover 30 is opened melted gum may be readily supplied from the separating tank to the still kettle.

On one side of the separating tank is a recovering apparatus which is here shown as a cylindrical tank 33, secured by angle irons 34 to and extending through the floor 35 of the scaffold or frame. The said tank 35 of the scaffold or frame. The said tank 33 has a funnel shaped bottom 35 hinged thereto at one side as at 36 and provided at its free side with a hasp 37 which in coaction with a staple 38 and a pin 39 enables the bottom to be secured in a closed position. In the upper, larger end of the hinged bottom is a screen 40 which opens and closes with the hinged bottom as will be understood. Said recovering tank is also provided with a hinged cover 41 and in the said tank is a vertically disposed perforated steam pipe 42 which is connected by a valve pipe 43 to the steam pipe 25. Said pipe 25 is provided with a valve 44 between the pipe 43 and the blow-up coil so that steam may be caused to pass through the steam pipe 42 of the blow-up coil as may be desired or through both of them simultaneously if required. The hinged bottom 35 of the recovering tank has a discharge spout 45 and in practice a cask or other receptacle 46 is placed below the same to receive the drippings from the recovering tank.

The operation of the invention is as follows: The crude gum in its usual condition, as mixed with chips, bark, sand, earth, and other impurities is placed on the screen in the separating tank. The heat from the steam coil melts the gum, which passes through the screen and drops into the separating tank, the screen preventing the passage of the chips, bark, and larger particles into the tank. The sand, earth, and other smaller impurities settle to the bottom of the separating tank. Steam from the blow-up coil may be directed up through the strainer and the mass of material thereon from time to time when required to dissolve the heavier gum and facilitate a separation thereof from the chips and bark. From time to time, the melted gum in the separating tank is drawn off therefrom through the spout 13 and fed to the still kettle through the duct 32. By first opening the gate 11, the chips and bark may be readily removed from the upper portion of the separating tank above the screen 20. The chips and bark from which the gum has been separated in the separating tank may then be placed in the recovering tank 33 and steamed for the purpose of recovering the comparatively small percentage of gum which may still adhere thereto, the drippings from the recovering tank being collected by the cask or receptacle 46. After the melted gum has been discharged from the separating tank, the sand and other particles of foreign matter separated from the gum and deposited in the bottom of the separating tank, may be drawn from the latter through the pipe 4 by opening the slide or valve 5.

What is claimed is:—

A gum filter comprising a rectangular separating tank having a hopper-shaped bottom provided at its lowest point with a discharge opening for the finer impurities, a valve for controlling the same, a discharge spout for the purified gum arranged at one side of the tank above the bottom thereof, a vertically movable gate or door in the side of the tank above the level of said discharge spout, a heating coil within the tank above the level of the discharge spout and below the level of said gate or door, a support within the tank at the level of the base of the door, a screen removably mounted upon said support at or near the level of the bottom of the gate or door, and an injector coil disposed within the tank between the heating coil and screen, said injector coil being provided with openings or nozzles for injecting currents of steam inwardly and upwardly through the screen.

In testimony whereof I affix my signature in presence of two witnesses.

CHARLES O. ERIKSON.

Witnesses:
  W. W. SOUTHERLAND,
  EUGENE MERIER.